US009169060B2

(12) United States Patent
Tremblay

(10) Patent No.: US 9,169,060 B2
(45) Date of Patent: Oct. 27, 2015

(54) BEVERAGE CONTAINER FOR BREWING APPARATUS

(71) Applicant: Christian Tremblay, Trois-Rivieres (CA)

(72) Inventor: Christian Tremblay, Trois-Rivieres (CA)

(*) Notice: Subject to any disclaimer, the term of this patent is extended or adjusted under 35 U.S.C. 154(b) by 249 days.

(21) Appl. No.: 13/815,260

(22) Filed: Feb. 14, 2013

(65) Prior Publication Data

US 2013/0224343 A1 Aug. 29, 2013

Related U.S. Application Data

(63) Continuation-in-part of application No. 13/385,542, filed on Feb. 24, 2012.

(51) Int. Cl.

| | |
|---|---|
| ***A47J 31/00*** | (2006.01) |
| ***B65D 81/32*** | (2006.01) |
| ***B65D 85/804*** | (2006.01) |
| ***A47J 47/14*** | (2006.01) |

(52) U.S. Cl.
CPC ............ *B65D 85/8043* (2013.01); *A47J 47/14* (2013.01)

(58) Field of Classification Search
CPC .... B65D 85/8043; A47J 47/14; A47J 31/005; A47J 31/50; B60N 3/18; F25B 21/02; F24H 4/04; F25D 31/006
USPC ...................... 99/295, 323, 317, 279, 289 R; 426/77–78, 82, 84, 86, 106, 112, 115, 426/132; 210/413–414, 120, 473–482; 100/110–121
See application file for complete search history.

(56) References Cited

U.S. PATENT DOCUMENTS

| | | | | |
|---|---|---|---|---|
| 492,161 | A * | 2/1893 | Hill | 210/414 |
| 1,984,047 | A * | 12/1934 | Thieme | 426/433 |
| 4,602,557 | A * | 7/1986 | Yip | 99/279 |
| 4,721,835 | A * | 1/1988 | Welker | 219/689 |
| 5,549,816 | A * | 8/1996 | Harp et al. | 210/120 |
| 5,738,786 | A * | 4/1998 | Winnington-Ingram | 210/474 |
| 5,855,160 | A * | 1/1999 | Shen | 99/279 |
| 6,314,866 | B1 * | 11/2001 | Melton | 99/322 |
| 6,645,537 | B2 * | 11/2003 | Sweeney et al. | 426/79 |
| 7,194,951 | B1 * | 3/2007 | Porter | 100/116 |
| 7,997,423 | B2 * | 8/2011 | Goodman et al. | 210/473 |
| 2004/0154471 | A1 * | 8/2004 | Tardif | 99/279 |
| 2005/0247205 | A1 * | 11/2005 | Chen et al. | 99/279 |
| 2006/0011066 | A1 * | 1/2006 | Bunn et al. | 99/279 |
| 2010/0011964 | A1 * | 1/2010 | White et al. | 99/279 |
| 2010/0173056 | A1 * | 7/2010 | Yoakim et al. | 426/433 |
| 2012/0017766 | A1 * | 1/2012 | Anson et al. | 99/290 |
| 2012/0164295 | A1 * | 6/2012 | Hansen et al. | 426/474 |
| 2012/0285334 | A1 * | 11/2012 | DeMiglio et al. | 99/300 |
| 2012/0308688 | A1 * | 12/2012 | Peterson et al. | 426/86 |
| 2013/0220142 | A1 * | 8/2013 | Tremblay | 99/323 |

* cited by examiner

*Primary Examiner* — Dana Ross
*Assistant Examiner* — Gyounghyun Bae
(74) *Attorney, Agent, or Firm* — Eric Fincham

(57) ABSTRACT

A beverage container for a brewing machine comprising a filter cup having a frame including an upper peripheral member and a lower peripheral member and filter material extending thereabout, a cover formed of a flexible material, the cover having a circular recess formed on a lower side of the cover to receive an upper wall of the upper peripheral member, the circular recess having an enlarged portion to receive a guide rib such that the cover is placed on the container in a predetermined location.

6 Claims, 6 Drawing Sheets

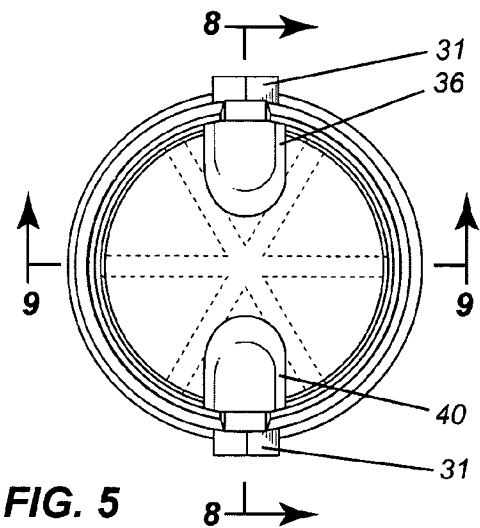
FIG. 5
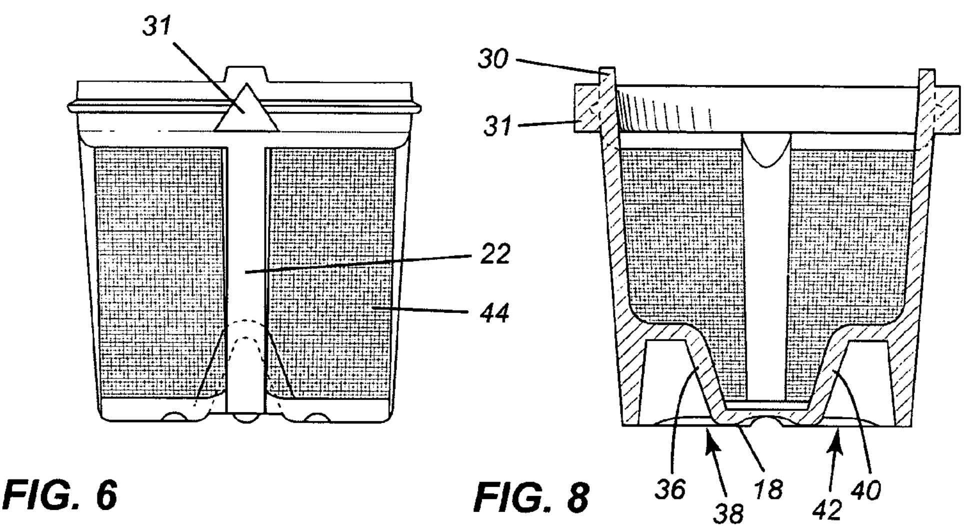
FIG. 6
FIG. 8
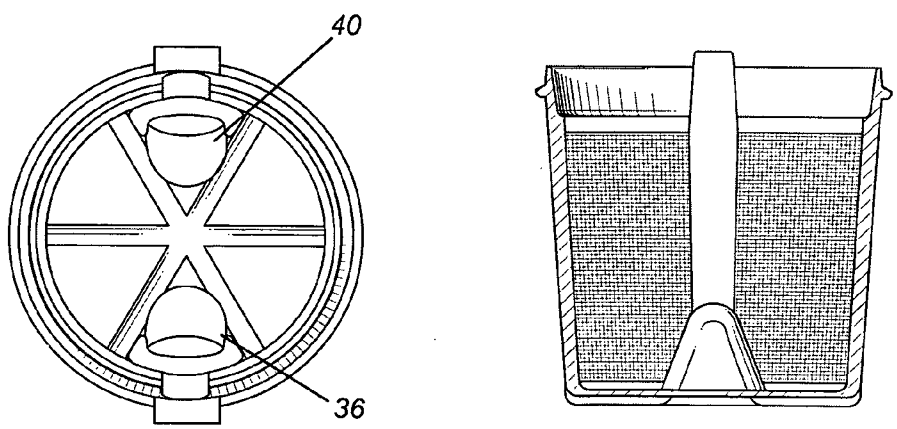
FIG. 7
FIG. 9

BEVERAGE CONTAINER FOR BREWING APPARATUS

This application is a Continuation-in-Part of application Ser. No. 13/385,542 filed Feb. 24, 2012.

FIELD OF THE INVENTION

The present invention relates to a beverage container for use in a brewing machine.

BACKGROUND OF THE INVENTION

The use of single cup brewing machines has become extremely popular for the past few years. The brewing machines are designed to brew a single cup of a drinking liquid. Such liquids or beverages include coffee, tea, chug drinks, etc. It suffices to say that there are many different beverages which can be brewed in such a machine.

The brewing machine basically comprises means for receiving the base of the beverage to be brewed. For simplicity, reference herein will be made to coffee as the beverage, although, as mentioned above, many different beverages can be prepared in such machines.

Most of the brewing machines have a place to receive the ground coffee and to maintain the coffee in a desired location. The brewing liquid (typically hot water) is then passed through the ground coffee to produce the final beverage.

With the advent of such machines, there is a demand for pre-packaged doses of the ground coffee. Sometimes these are placed in a permanent mesh filter and other times, they are pre-packaged in a disposable filter.

SUMMARY OF THE INVENTION

It is an object of the present invention to provide a pre-packaged beverage container for use with a brewing machine.

According to one aspect of the present invention, there is provided a beverage container for a brewing machine comprising a filter cup, the filter cup having a frame, the frame having an upper peripheral member and a lower peripheral member, the upper peripheral member including an upper wall extending thereabout, the upper peripheral member having at least one guide rib formed on an inner surface of the upper wall, a filter material adjacent the frame, the filter material permitting passage of a liquid therethrough, a cover for the filter cup, the cover being formed of a flexible material, the cover having an opening therein, the cover having a circular recess formed on a lower side of the cover, the circular recess being arranged to tightly receive the upper wall of the upper peripheral member, the circular recess having at least a first enlarged portion to receive the guide rib, the cover having first and second diametrically opposed ears extending outwardly therefrom, and a holder for the beverage container, the holder being sized to engage the filter cup to impede passage of air to the bottom of the holder, the holder having first and second recesses formed in a top wall thereof, the diametrically opposed ears seating in the first and second recesses.

The description of the instant invention will refer to coffee as the beverage being brewed. However, as previously mentioned, such brewing machines are utilized to prepare many different beverages and thus the present invention is not limited to the use of coffee. Tea, hot cocoa and iced beverages may also be prepared. The brewing machine particularly adapted to receive the beverage container of the instant invention is that manufactured by Keurig.

The filter cup, as set forth above, has a frame which provides a plurality of openings and which openings are covered by a filter medium. The filter cup may be formed of any suitable material such as a metallic or plastic material with the latter being preferred. The filter medium may also be selected from those well known in the art. The selection of the particular filter material can depend on whether the filter cup is intended to be a single use or multi use. A preferred filter medium is a mesh type filter.

The filter cup has an upper peripheral member and a lower peripheral member. Each of the peripheral members is preferably of a circular configuration with the upper peripheral member being larger than the lower peripheral member. The upper and lower peripheral members are connected by a pair of ribs extending therebetween. Due to the difference in size between the upper peripheral member and the lower peripheral member, the ribs will extend diagonally outwardly from the lower peripheral member to the upper peripheral member.

The upper peripheral member will include a wall. The first and second ribs are formed so as to form guide ribs on the inner portion of the wall for reasons which will become apparent hereinbelow. While reference is being made herein to a pair of ribs, more may be utilized if so desired. However, so doing would reduce the area through which the liquid could exit from the interior of the filter cup.

Extending outwardly from the wall is a flange, which flange will aid in the sealing of the filter cup with the cover member.

The base of the filter cup may either be closed or open as desired. Naturally, when open it provides a larger area for the liquid to exit from the filter cup.

The cover, as aforementioned, is formed of a flexible material. The nature of the material permits the sealing between the filter cup and the cover. Such flexible materials can include natural rubber, synthetic rubbers, silicone, etc. The cover includes means to permit the injection of the liquid to the filter cup. Accordingly, there is provided a slit which is resealable. In other words, the nozzle may be placed through the slit with sides giving way to permit the nozzle to enter, but also to permit the top to reseal itself.

Most of the top will be relatively thick while the nature of the slit demands that the area therearound be relatively thin. Accordingly, there may be provided a recess in the top, the recess containing the slit. Alternatively, material could be removed from the bottom in the area of the slit. The slit, in a preferred embodiment, has a Y-shaped configuration.

The cover will also have at least one ear and preferably a pair of ears extending outwardly therefrom. The ears are intended to locate the cover in the correct position with respect to the holder.

There is provided a recess, which is preferably of a circular nature, in the bottom of the cover. This recess is designed to receive the upper wall and outwardly extending flange on the upper peripheral member to ensure a tight seal is achieved. In one portion of the recess, there are provided secondary recesses to receive the guide ribs formed on the circular wall. These guide ribs ensure that the cover and filter cup are properly located with respect to each other.

There is also provided a holder for the beverage container, the holder being formed of a suitable material such as a plastic material. The holder is designed to receive the filter cup and cover. The walls of the holder extend upwardly at an angle different than that for the filter cup whereby the bottom peripheral member will seal against the walls of the holder to be hermetically sealed and to prevent air passing therethrough. The holder will also have recesses formed in a top wall thereof to receive and engage the diametrically opposed ears.

BRIEF DESCRIPTION OF THE DRAWINGS

Having thus generally described the invention, reference will be made to the accompanying drawings illustrating an embodiment thereof, in which:

FIG. 5 is a bottom plan view of the beverage container;

FIG. 6 is a side elevational view thereof as seen from the top of FIG. 5;

FIG. 7 is a top plan view thereof;

FIG. 8 is a sectional view taken along the lines 8-8 of FIG. 5;

FIG. 9 is a sectional view taken along the lines 9-9 of FIG. 5;

DETAILED DESCRIPTION OF THE INVENTION

Figure 1:
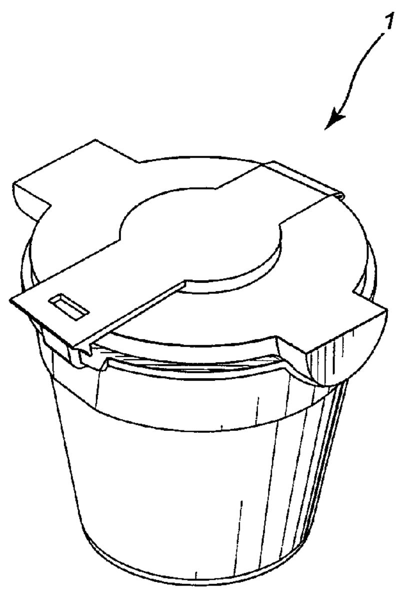
FIG. 1 is a perspective view of the beverage container of the present invention.

Referring to the drawings in greater detail and by reference characters thereto, there is illustrated in FIG. 1 an assembled beverage container with a holder for use with a brewing machine (not shown).

Figure 2:
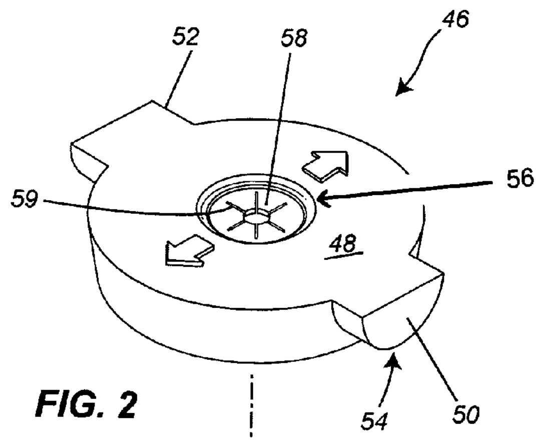
FIG. 2 is a perspective view of the cover member of the beverage container of the present invention.
Figure 3:
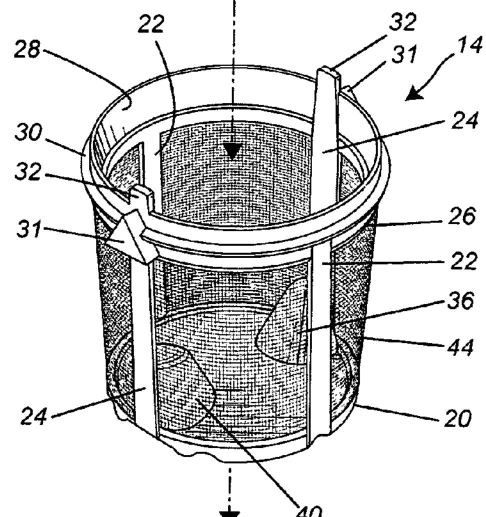
FIG. 3 is a perspective view of the filter cup of the beverage container of the present invention, the filter cup being shown without a filter material for greater clarity.
Figure 4:
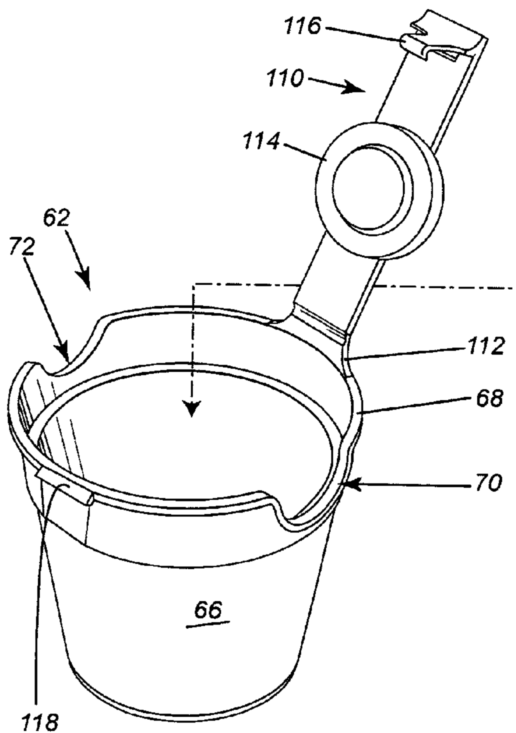
FIG. 4 is a perspective view of the holder for the beverage container of the instant invention.

The assembled beverage container and holder which is generally designated by reference numeral 10 and as may be best seen in FIGS. 2, 3 and 4, includes a cover 46, a filter cup 14, and a holder designated by reference numeral 62.

Filter cup 14 has a body generally designated by reference numeral 16. Body 16 includes a base 18 and a base outer periphery 20. In the illustrated embodiment, base 18 is illustrated as being solid. In an alternative, the base may be opened and covered with the same filter material as the sides.

It will be noted that body 16 includes a first pair of upwardly extending ribs 22 and a second pair of upwardly extending ribs 24. Each of ribs 22 extends from the base outer periphery 20 to an upper outer periphery 26, while ribs 24 extend slightly above upper outer periphery 26. Upper outer periphery 26 is generally circular in configuration and includes an upwardly extending circular wall 28 and an outwardly extending flange 30 which extends outwardly from circular wall 28. As may be seen in FIG. 3, each of the ribs 24 extends upwardly a distance sufficient that they form a pair of guide segments 32 on an inner surface of circular wall 28. A pair of triangular guide members 31 are formed on upwardly extending circular wall 28. As will be seen, a wall 36 extends upwardly from base 18 proximate rib 22, so as to form a recess 38 in the underside of the base. Similarly, a second wall 40 extends upwardly adjacent rib 24 to provide a second recess 42 in the base 18. Recesses 38 and 42 are designed to receive a guide pin (not shown) in the brewing machine. A mesh 44 functions as a filter to permit the passage of liquid therethrough.

A cover generally designated by reference numeral 46 includes a top or upper surface 48. Cover 46 is preferably formed of a first ear 50 which extends outwardly from top surface 48 and in a diametrically opposed position, a second ear 52 extends outwardly. It will be noted that each ear 50, 52 has a rounded bottom generally designated by reference numeral 54.

Cover 46 has a recess 56 formed in top surface 48. Recess 56, has an aperture 58 surrounded by slits 59. Aperture 58 is designed to permit the insertion of a water injector which will inject water onto the contents of the filter cup 14 while at the same time permitting resealing when the water injector is moved.

A retaining strap 110 is provided for retaining the cover in position. Retaining strap 110 is connected by hinge 112 to a side wall 66 of container 62. Located centrally of retaining strap 110 is a circular projection 114 which is designed to fit within recess 56 and seal aperture 58. Located at the opposite or distal end of retaining strap 110 is a hook like configuration 116 designed to engage projection 118 on container 66.

Figure 10:
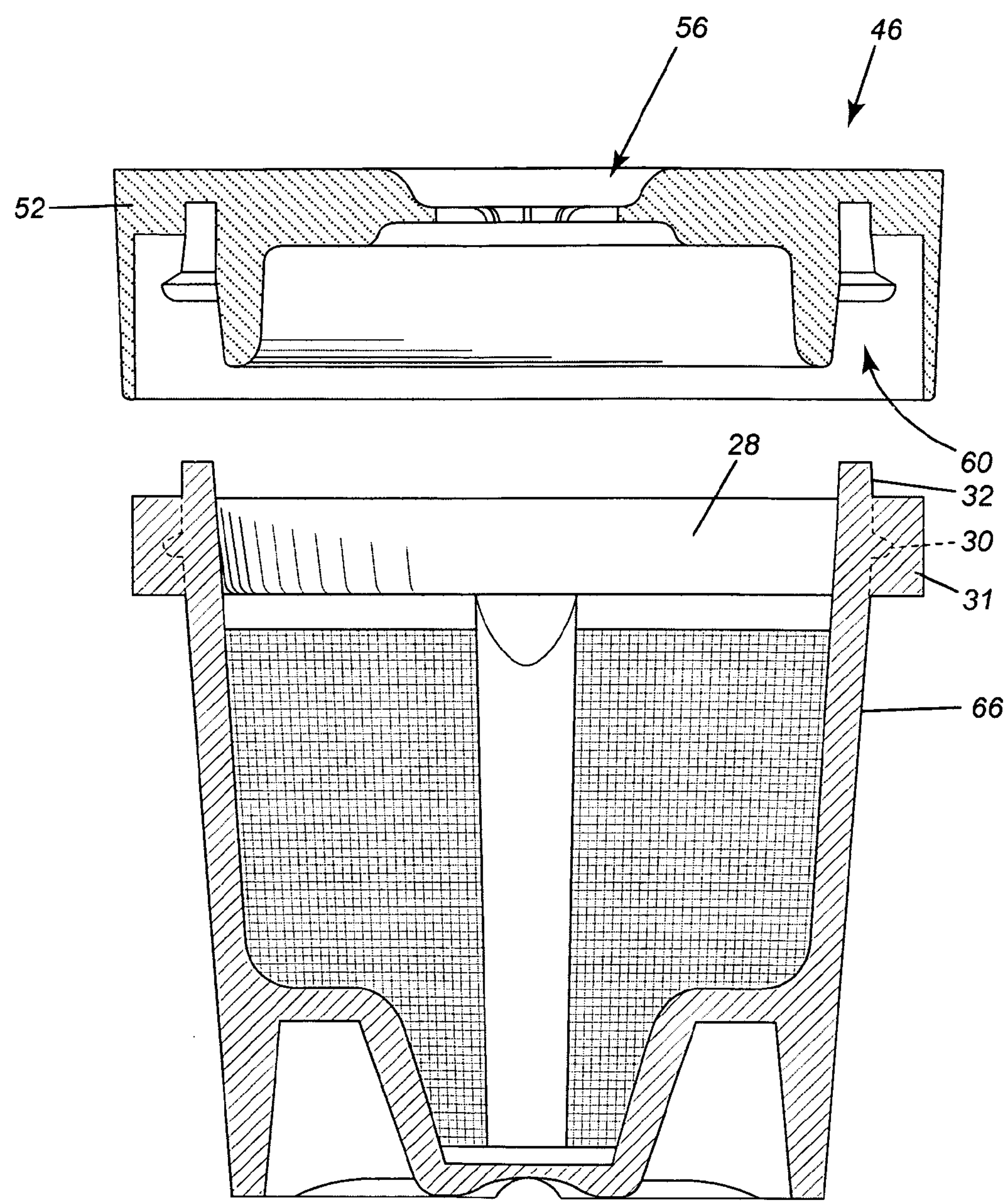
FIG. 10 is a partially exploded view illustrating the beverage container in an assembled condition with the cover and holder.
Figure 11:
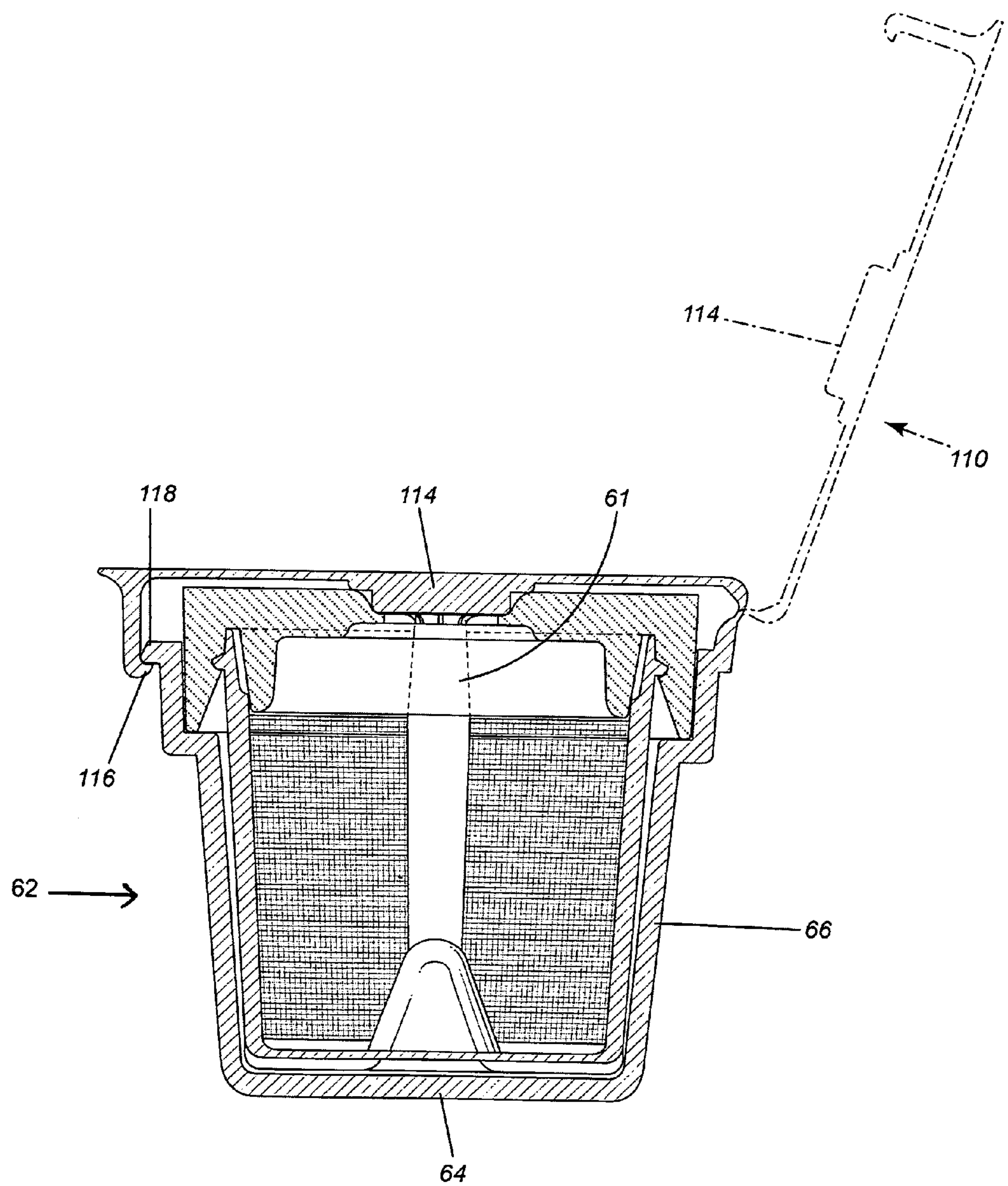
FIG. 11 is a cross sectional view of the assembled container.
Figure 12:
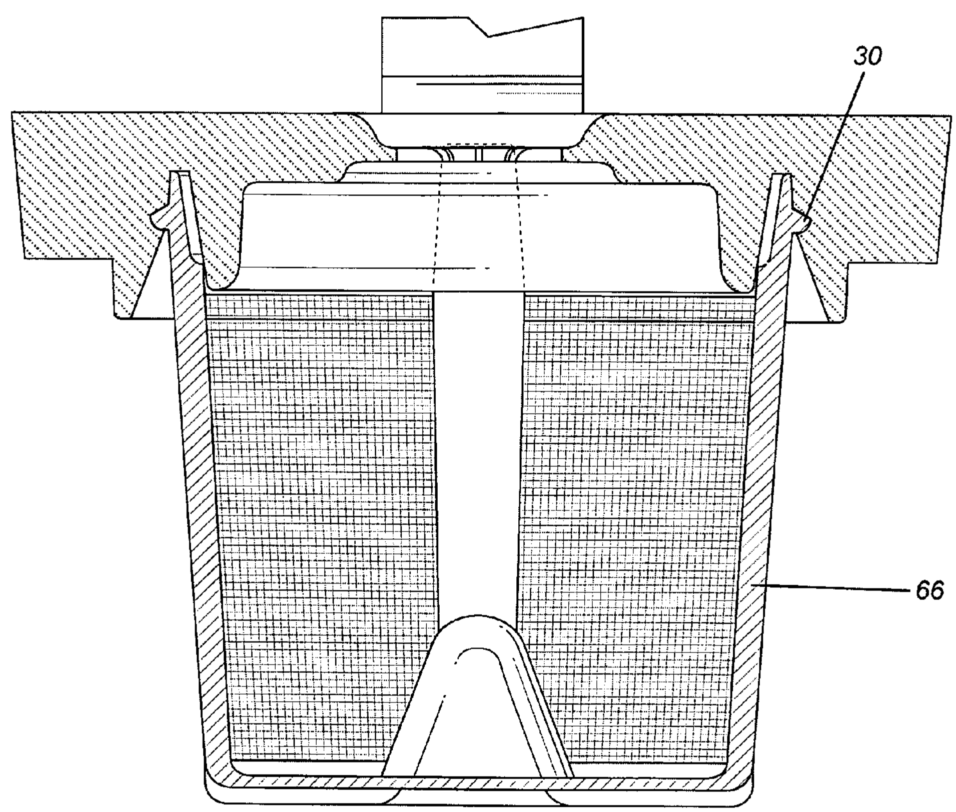
FIG. 12 is a sectional view of the beverage container with the filter medium.

As may best be seen in FIGS. 10 and 11, on the bottom of cover 46 there is provided a circular recess 60 which is designed to receive circular wall 28 and outer flange 30 to provide a tight seal therebetween. Recess 56 also includes a pair of enlarged recess portions 61 which are designed to receive guide rib 32 and guide members 31. This ensures that the cover is placed in a proper position on filter cup 14.

Storage container 62 is designed to receive one of the filter cups with a cover thereon. Storage container 62 includes a base 64 upon which sits a circular wall 66. Wall 66 angles out slightly in a tapered direction as may be seen from FIG. 10. A top rim 68 has a first recess 70 and a second recess 72 which are designed to receive ears 50 and 52 respectively as may be seen in FIG. 1. It will be noted that the circular wall 66 is sized such that there is tight engagement therebetween at the bottom of base 18.

Figure 13:
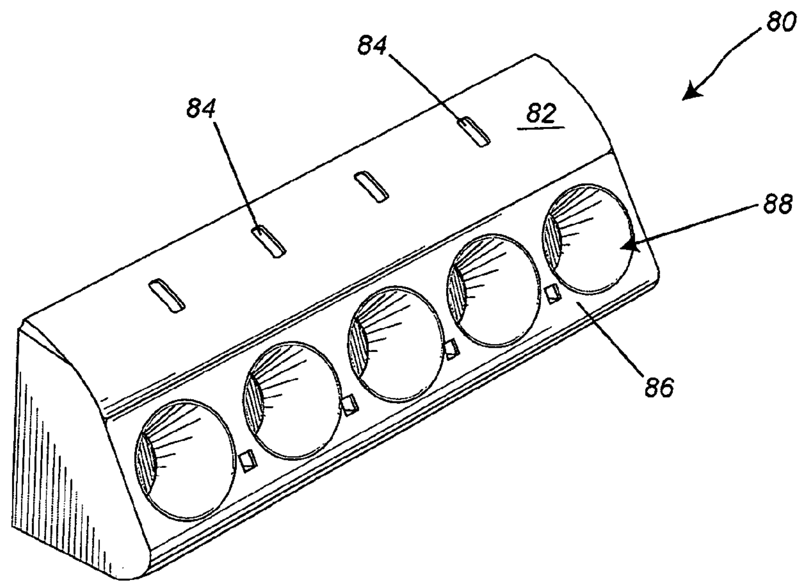
FIG. 13 is a perspective view of a storage device for the beverage containers.
Figure 16:
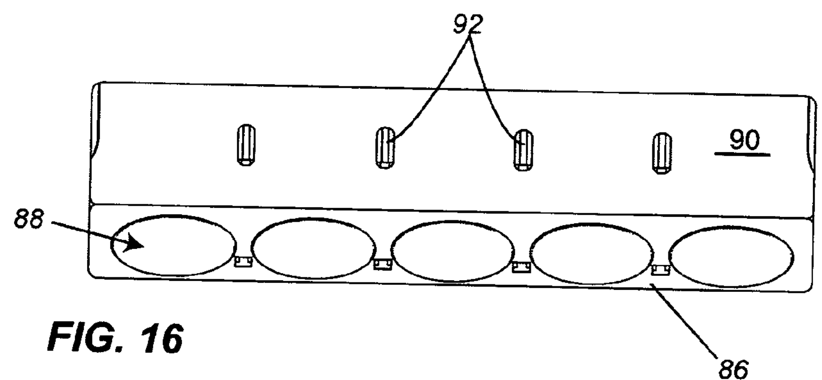
FIG. 16 is a top plan view thereof.
Figure 15:
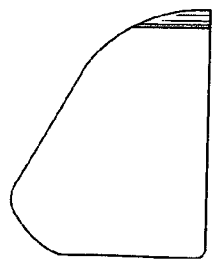
FIG. 15 is an end view thereof.
Figure 14:
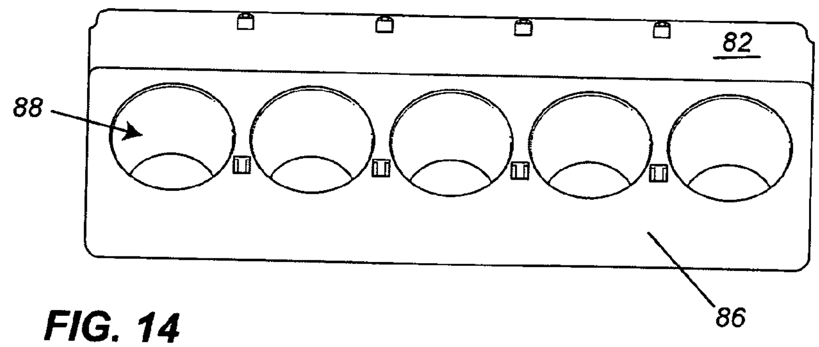
FIG. 14 is a front view of the storage device.

As shown in FIGS. 13 to 15, there may be provided a plurality of storage racks 80 for use with the beverage container. Each storage rack 80 includes a top wall 82 having slots 84 formed therein. A sloping front wall 86 has a plurality of recesses 88, each recess 88 being designed to receive one of the beverage containers of the present invention. A bottom wall 90 has L-shaped projections 92 to permit stacking of the storage racks, each projection 92 fitting within a corresponding recess 84 to securely hold the storage racks together.

It will be understood that the above described embodiment is for purposes of illustration only and that changes and modifications may be made thereto without departing from the spirit and scope of the invention.

I claim:

1. A beverage container for a brewing machine comprising:

a filter cup, said filter cup having a frame, said frame having an upper peripheral member and a lower peripheral member, first and second pairs of ribs extending between said upper peripheral member and said lower peripheral member, said upper peripheral member including an upper wall extending thereabout, said upper peripheral member having at least one guide rib formed on an inner surface of said upper wall, first and second guide segments formed on an inner surface of said upper wall, said first and second guide segments being extensions of said second pair of ribs extending between said upper peripheral member and said lower peripheral member, a filter material adjacent said frame, said filter material permitting passage of a liquid therethrough;

a cover for said filter cup, said cover being formed of a flexible material, said cover having an opening therein, said cover having a circular recess formed on a lower side of said cover, said circular recess being arranged to tightly receive said upper wall of said upper peripheral member, said circular recess having at least a first enlarged portion to receive said guide rib, said cover having first and second diametrically opposed ears extending outwardly therefrom; and a holder for said beverage container, said holder being sized to engage said filter cup to impede passage of air to the bottom of said holder, said holder having first and second recesses formed in a top wall thereof, said diametrically opposed ears seating in said first and second recesses.

2. The beverage container of claim 1 further including a recess formed in a bottom of said base.

3. The beverage container of claim 2 wherein said upper wall has an outwardly extending flange formed thereon.

4. The beverage container of claim 1 wherein said base is open.

5. The beverage container of claim 1 wherein said opening in said cover includes a plurality of slits radiating outwardly from said opening.

6. The beverage container of claim 5 further including a retaining strap secured to said holder, said retaining strap sealing said opening in said cover when in a closed position.

* * * * *